(12) United States Patent
Tominaga et al.

(10) Patent No.: US 9,676,408 B2
(45) Date of Patent: Jun. 13, 2017

(54) ELECTRIC DRIVING DEVICE AND ELECTRIC POWER STEERING APPARATUS EQUIPPED WITH THE SAME

(75) Inventors: Tsutomu Tominaga, Chiyoda-ku (JP); Katsuhiko Ohmae, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 188 days.

(21) Appl. No.: 13/508,687

(22) PCT Filed: Sep. 16, 2010

(86) PCT No.: PCT/JP2010/066055
§ 371 (c)(1),
(2), (4) Date: May 8, 2012

(87) PCT Pub. No.: WO2011/114554
PCT Pub. Date: Sep. 22, 2011

(65) Prior Publication Data
US 2012/0229005 A1    Sep. 13, 2012

(30) Foreign Application Priority Data

Mar. 19, 2010    (JP) .................................. 2010-064078

(51) Int. Cl.
*H02K 5/22*      (2006.01)
*B62D 5/04*      (2006.01)
(Continued)

(52) U.S. Cl.
CPC ........... *B62D 5/0406* (2013.01); *H02K 3/522* (2013.01); *H02K 5/225* (2013.01); *H02K 11/38* (2016.01); *H02K 15/0068* (2013.01)

(58) Field of Classification Search
CPC .... H02K 29/08; H02K 11/0021; H02K 5/225; B62D 5/0406
(Continued)

(56) References Cited

U.S. PATENT DOCUMENTS 4,368,938 A * 1/1983 Mabuchi ....................... 439/174
4,626,721 A * 12/1986 Ouchi ............................. 310/71
(Continued)

FOREIGN PATENT DOCUMENTS

CN            1133506 A       10/1996
CN            1074198 C       10/2001
(Continued)

OTHER PUBLICATIONS

Chinese Office Action, issued Jan. 24, 201, Patent Application No. 2010800623799.

*Primary Examiner* — Terrance Kenerly
(74) *Attorney, Agent, or Firm* — Sughrue Mion, PLLC; Richard C. Turner

(57) ABSTRACT

Reduction in costs and size of an electric driving device is achieved and reliability of electrical connection thereof is enhanced. The device comprises: an electric motor; a controller that is disposed coaxially with the axis of the electric motor rotation shaft and takes control of driving the electric motor; a motor terminal whose end extends from the electric motor toward the controller; and an output terminal whose end extends from the controller toward the electric motor; wherein a portion of the motor terminal including the end thereof and that of the output terminal including the end thereof each are formed to extend in parallel to an axial direction of the electric motor, and overlappingly connected with each other.

14 Claims, 8 Drawing Sheets

(a)

(b)

(51) Int. Cl.
*H02K 3/52* (2006.01)
*H02K 11/38* (2016.01)
*H02K 15/00* (2006.01)

(58) Field of Classification Search
USPC .................................................. 310/71, 68 B
See application file for complete search history.

(56) References Cited

U.S. PATENT DOCUMENTS

| | | |
|---|---|---|
| 5,686,780 A | 11/1997 | Adachi et al. |
| 2005/0082835 A1* | 4/2005 | Shimoyama et al. ...... 290/38 R |
| 2007/0001528 A1* | 1/2007 | Umegaki ............... H02K 3/522 |
| | | 310/88 |
| 2007/0120431 A1* | 5/2007 | Kokubu et al. ............. 310/75 R |
| 2009/0304536 A1* | 12/2009 | Egawa et al. ............ 417/423.14 |

FOREIGN PATENT DOCUMENTS

| | | | |
|---|---|---|---|
| JP | 5-179669 A | 7/1993 |
| JP | 6-189485 A | 7/1994 |
| JP | 2006-034073 A | 2/2006 |
| JP | 2007-062433 A | 3/2007 |
| JP | 2008-211945 A | 9/2008 |
| JP | 2009-005510 A | 1/2009 |

\* cited by examiner (a)

(b)

ELECTRIC DRIVING DEVICE AND ELECTRIC POWER STEERING APPARATUS EQUIPPED WITH THE SAME

CROSS REFERENCE TO RELATED APPLICATIONS

This application is a National Stage of International Application No. PCT/JP2010/066055 filed Sep. 16, 2010, claiming priority based on Japanese Patent Application No. 2010-064078, filed Mar. 19, 2010, the contents of all of which are incorporated herein by reference in their entirety.

BACKGROUND OF THE INVENTION

Field of the Invention

The present invention relates to an electric driving device and an electric power steering apparatus that assistively biases a vehicle steering system by driving power from the electric driving device.

Description of the Related Art

A driving device for an electric power steering apparatus has been conventionally known, which includes an electric motor that outputs assisting torque to a vehicle steering wheel, and a controller that is mounted to the electric motor and drives the motor in a controlled manner. In this electric driving device, the controller is disposed coaxially with the axis of the electric motor rotation shaft and fixed to the motor. Moreover, motor terminals, which are output terminals, extend from the controller toward the electric motor, and whose ends are bent outwardly in a radial direction of the motor and screwed to winding terminals of the electric motor, outside a connecting member formed in a U-shape. Here, the motor terminals and winding terminals overlap each other in an axial direction of the electric motor rotation shaft, and are screwed together from the opposite side of the output shaft of the electric motor, so as to be electrically connected with each other (refer to Patent Document 1, for example).

Patent Document 1: Japanese Laid-Open Patent Publication No. 2007-62433 (Paragraph 0020 and FIG. 4)

The electric driving device disclosed in the foregoing Patent Document 1 needs screws for electrically connecting the motor terminals with the winding terminals. Moreover, it needs not only a space for the motor terminals and winding terminals to overlap each other outside the connecting member, but also a space for screwing. As a result, a problem has been that the number of parts increases, thereby pushing up costs, and in addition the device size increases. Moreover, the motor terminals and winding terminals are screwed and electrically connected with each other; therefore another problem has been that the screws would get loose due to vibration, heat cycle and the like in their environment of use, thereby deteriorating reliability of the electrical connection.

SUMMARY OF THE INVENTION

The present invention has been made to resolve the foregoing problems, and aims at providing an electric driving device in which reduction in size and costs can be achieved and also reliability of the electrical connection can be enhanced, and an electric power steering apparatus equipped with the electric driving device.

An electric driving device according to the present invention comprises: an electric motor; a controller that is disposed coaxially with the axis of the electric motor rotation shaft and takes control of driving the electric motor; a motor terminal whose end extends from the electric motor toward the controller; and an output terminal whose end extends from the controller toward the electric motor; wherein a portion of the motor terminal including the end thereof and that of the output terminal including the end thereof each are formed to extend in parallel to an axial direction of the electric motor, and overlappingly connected with each other.

According to an electric driving device of the present invention, the motor terminal and output terminal are formed to extend in parallel to the axial direction of the electric motor, and in addition overlappingly connected with each other, whereby reduction in size and costs can be achieved, and reliability of the electrical connection can be enhanced.

The foregoing and other object, features, aspects and advantages of the present invention will become more apparent from the following detailed description of the present invention when taken in conjunction with the accompanying drawings.

DETAILED DESCRIPTION OF THE PREFERRED EMBODIMENTS

Hereinafter, preferred embodiments of an electric driving device of the present invention and an electric power steering apparatus equipped with the same will be explained referring to the accompanying drawings. Incidentally, this invention is not limited to those embodiments, but includes various kinds of design alterations.

Embodiment 1

Figure 1:
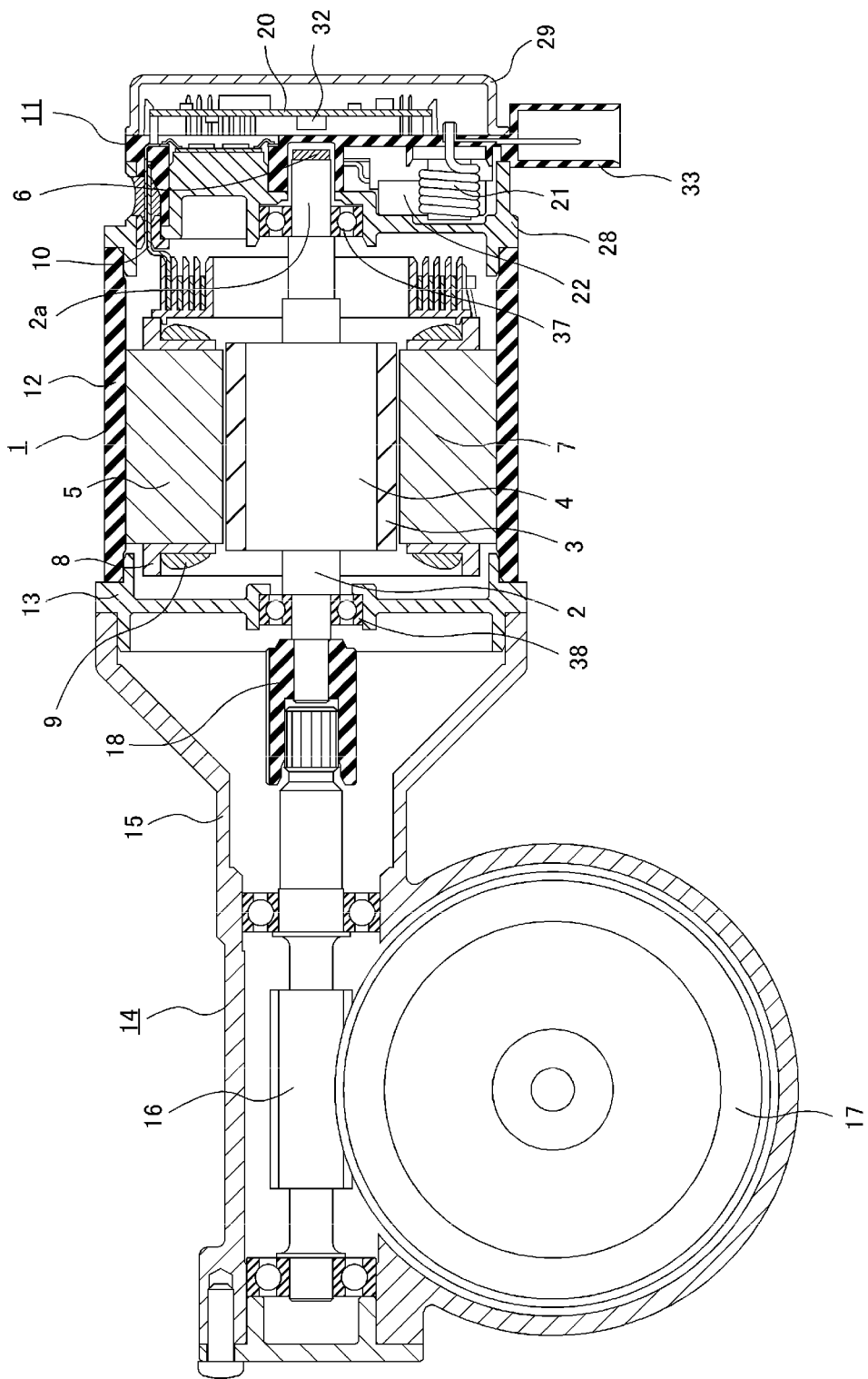
FIG. 1 is a cross-sectional view showing an electric power steering apparatus according to Embodiment 1 of the present invention.
Figure 2:
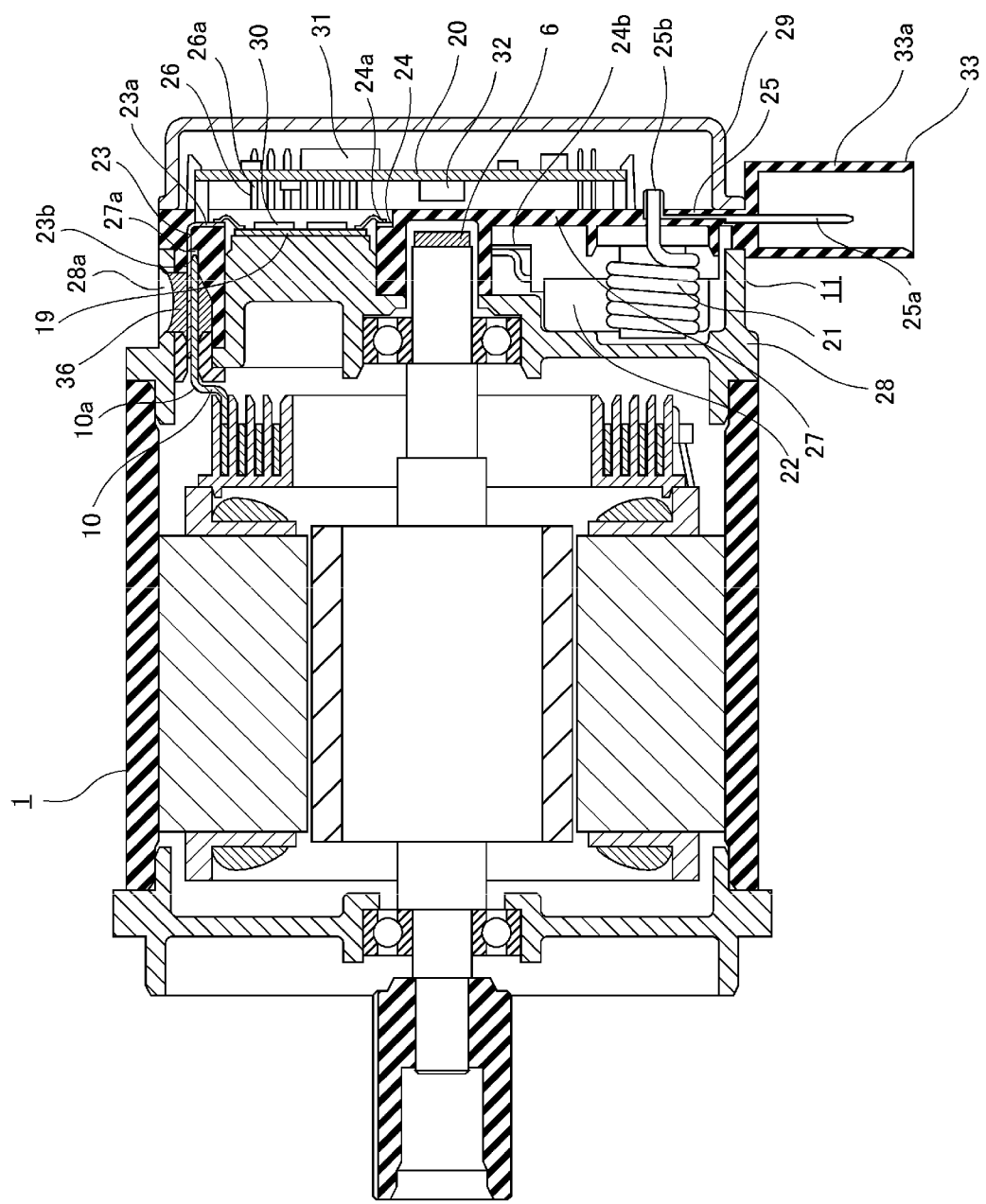
FIG. 2 is a cross-sectional view of an electric driving device according to Embodiment 1 of the invention.

FIG. 1 is a cross-sectional view showing an electric power steering apparatus according to Embodiment 1 of the present invention; FIG. 2 is a cross-sectional view of an electric driving device according to Embodiment 1 of the invention.

In FIG. 1 and FIG. 2, an electric motor 1 that is a power source for the electric driving device and constituted of a three-phase brushless motor includes: an output shaft 2; a rotor 4 in which a permanent magnet 3 having eight magnetic poles is fixed to the output shaft 2; a stator 5 disposed surrounding the rotor 4; and a sensor permanent magnet 6 that is disposed on a shaft end face 2a on the opposite side of the output shaft 2 and magnetized with two poles corresponding to the magnetic pole locations of the permanent magnet 3 of the rotor 4.

The foregoing stator 5 includes 12 protrudent poles 7 facing the outer circumferential surface of the permanent magnet 3, an insulator 8 fitted to the protrudent poles 7, and armature windings 9 wound around the insulator 8 and connected to three phases of U-, V- and W-phase. The armature windings 9 are star-connected with each other, and three winding ends of which are connected to three such terminals as a terminal 10 disposed on the shaft end face 2a side of the output shaft 2. The end of the motor terminal 10 extends toward a controller 11, and in addition is formed to extend in parallel to an axial direction of the electric motor 1. The motor terminal 10 is bent in a crank-shape to form a bent section 10a, and welded to the controller 11 on the tip side of the bent section 10a and electrically connected with each other. Incidentally, the bent section 10a serves as an elastic member, which relieves stress at the weld portion due to difference in the linear expansion coefficient of each of the parts during the welding or in a temperature environment of the device being used. Moreover, the stator 5 is fixed to a motor casing 12 made of aluminum. Furthermore, the motor casing 12 to which the stator 5 is fixed is fastened to a bracket 13 with screws (not shown).

The electric motor 1 is fixed to a reduction gear 14, which serves as a speed reduction mechanism. The reduction gear 14 includes a gearbox 15 to which the bracket 13 of the electric motor 1 is fixed, a worm gear 16 that is disposed inside the gearbox 15 and reduces rotation speed of the output shaft 2, and a worm wheel 17 that engages with the worm gear 16. A spline is formed at one end of the worm gear 16. A coupler 18, on the inner surface of which is formed a spline, is press-fitted onto the end of the output shaft 2. Then the coupler 18 and the end of the worm gear 16 are engaged with each other by the spline, and torque is set to be transmitted from the electric motor 1 to the reduction gear 14.

The controller 11 that takes control of driving the electric motor 1 includes: a power board 19 made of a high heat-conductive ceramic board; a control board 20 made of an insulative printed circuit board; a coil 21 that removes electromagnetic noise; a capacitor 22 with a large capacitance (2200 µF×3 or so) that absorbs ripple components of a motor current flowing through the electric motor 1; a circuit casing 27 in which a plurality of conductive plates 23, 24, 25, 26, etc. is insert-molded in insulative resin; a heatsink 28 made of high heat-conductive aluminum; and a cover 29 that is made of insulative resin and attached as covering the control board 20.

The foregoing power board 19 is made of, for example, a DBC (registered trademark of Toshiba Materials Co., Ltd.) board; copper foil is formed as wiring patterns on the ceramic board made of alumina. Moreover, on the power board 19 are mounted and soldered high current parts such as semiconductor switching elements (for example, FETs) 30 that constitute a three-phase bridge circuit for switching over the motor current through the electric motor 1, depending on the magnitude and direction of assisting torque, and shunt resistors (not shown) that detect the motor current through the electric motor 1.

The foregoing control board 20 is made of a multilayer glass epoxy board (for example, four layers), and on which are mounted and soldered a microcomputer 31, a magnetic sensor 32 that detects the direction of the magnetic field by the sensor permanent magnet 6, and circuit elements (low current parts) of peripheral circuits including a drive circuit and motor current detection circuit (not shown). The microcomputer 31 computes assisting torque based on a steering torque signal from the torque sensor (not shown), and in addition it feeds back the motor current flowing through the electric motor 1 detected by the current detection circuit (not shown) via one end of the shunt resisters (not shown), and the rotational position of the rotor 4 detected by the magnetic sensor 32, and thereby computes the current corresponding to the assisting torque. Then this microcomputer 31 is set to output a drive signal for controlling the semiconductor switching elements 30 of the bridge circuit.

Moreover, although not shown in the figure, the microcomputer 31 includes a well-known self diagnosis function in addition to an AD converter, a PWM timer circuit, etc., and always self-diagnoses whether or not the system is operating properly. If any abnormality occurs, the motor current can be interrupted.

The magnetic sensor 32 mounted on the control board 20 is made of a magnetic resistance element and opposite to the permanent magnet 6 disposed on the shaft end face 2a of the rotor 4 of the electric motor 1. The direction of the magnetic field by the sensor permanent magnet 6 rotates in accordance with the rotation of the rotor 4 of the electric motor 1. The magnetic resistance of the magnetic sensor 32 varies in accordance with the rotation of this magnetic field, and as a result the rotational position of the rotor 4 can be detected. The magnetic sensor 32 employs a method of detecting the direction of the magnetic field; therefore, positional accuracy required for fixing the sensor permanent magnet 6 is not so high in the axial direction of the rotation shaft, compared to that for a Hall-element-type magnetic sensor.

In the circuit casing 27, the plurality of conductive plates 23, 24, 25 and 26 insert-molded in the insulative resin constitutes circuit patterns as described above. A pad 23a for connecting one end of the conductive plate 23 with the power board 19 by wire bonding is formed on a side of the circuit casing 27, being exposed from the insulative resin, and an output terminal 23b is formed at the other end of the conductive plate 23. The output terminal 23b is formed in such a way that the end of the terminal extends toward the electric motor 1, in parallel to the axial direction of the electric motor 1.

Moreover, a groove 27a is formed in the circuit casing 27, which is one of the holding members of the output terminal 23b, at a portion where the output terminal 23b projects from the insulative resin, in a location radially inside the electric motor 1, and the motor terminal 10 is inserted into this groove 27a.

Figure 3:
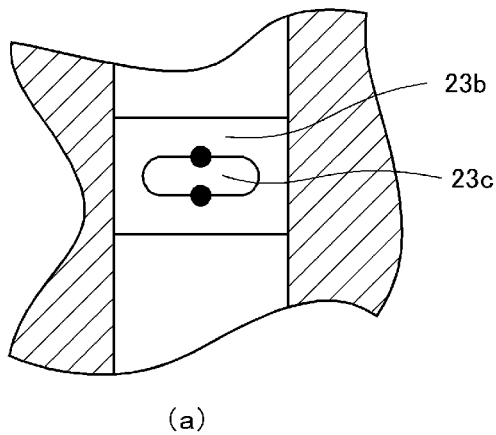
FIG. 3 is a plan and cross-sectional view showing an enlarged essential portion of the electric driving device according to Embodiment 1 of the invention.
Figure 3:
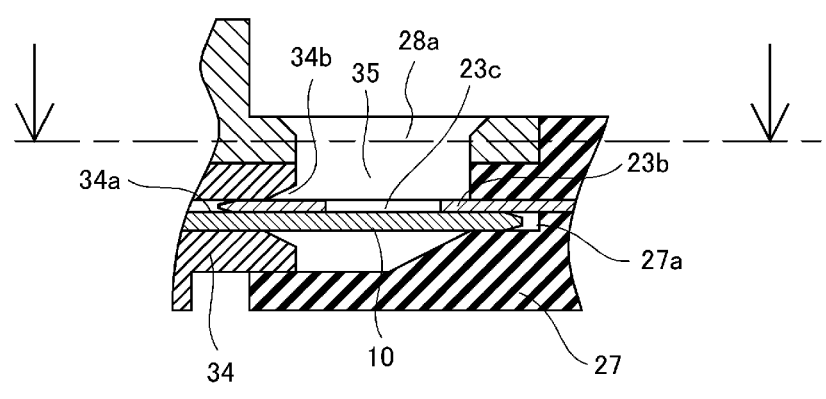
Figure 4:
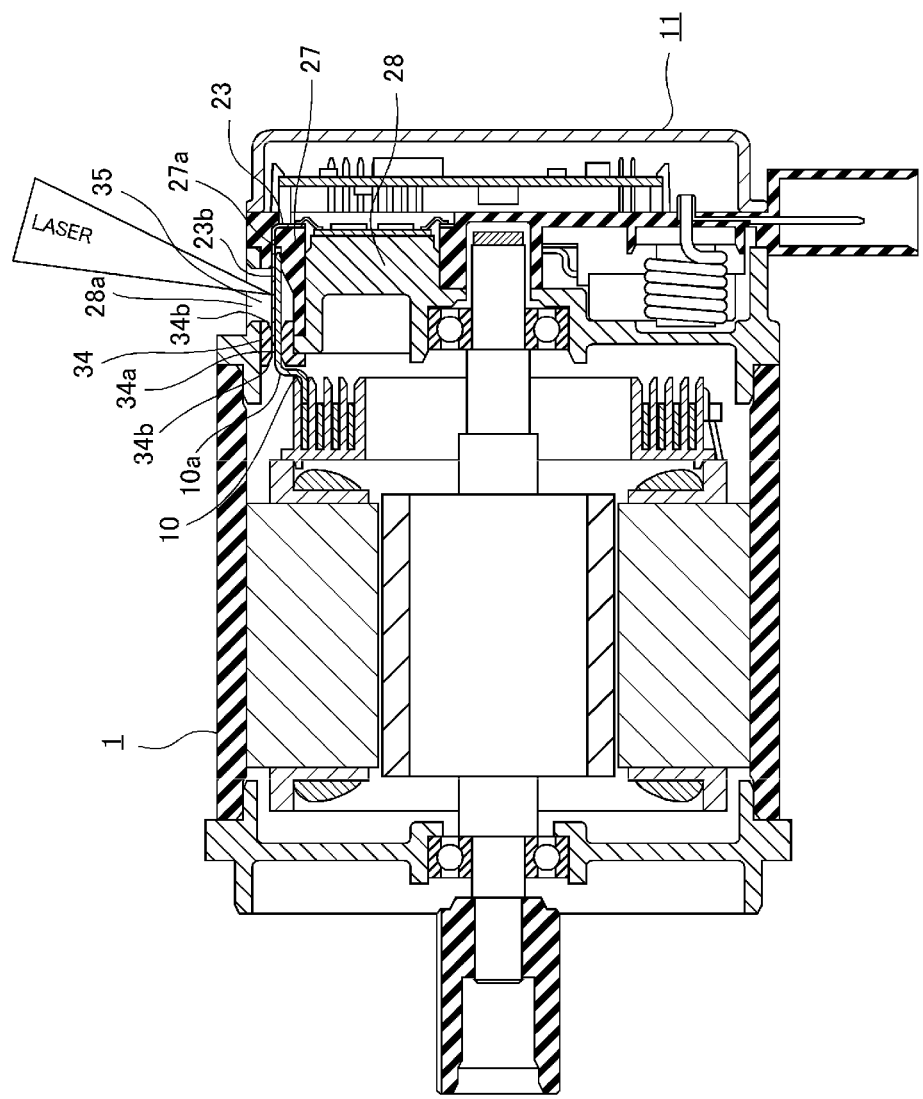
FIG. 4 is a cross-sectional view for explaining a method of manufacturing the electric driving device according to Embodiment 1 of the invention.

Moreover, an oblong hole 23c is made through the output terminal 23b as shown in the enlarged view in FIG. 3. Moreover as described above, the output terminal 23b overlaps the motor terminal 10 in a radial direction of the electric motor 1, with the output terminal 23b disposed on the outer side of the motor terminal. Furthermore as shown in FIG. 4, the inner circumferential edge of the hole 23c is irradiated by a laser beam from outside the electric motor 1 in the radial direction, with the output terminal 23b and motor terminal 10 overlapping each other, so that those terminals are laser-welded with each other. Incidentally, by inspecting a melting state of the inner circumferential edge of the hole 23c and the surface of the motor terminal 10, a laser-welding state after the welding can be made sure.

The output terminal 23b and motor terminal 10 are electrically connected with each other by laser-welding in this way. At this time, the weld portion is located on the tip side of the bent section 10a of the motor terminal 10. Moreover, the weld portion of the motor terminal 10 with the output terminal 23b is distant from the casing 27, which is the one of the holding members, in both the radial and axial directions of the electric motor 1. Therefore, the insulative resin of the circuit casing 27 can be prevented from eroding and deteriorating due to heat from the laser-welding or reflection of the laser beam.

Moreover, a pad 24a, which serves as a power source terminal that is connected to the power board 19 by wire bonding for supplying a current, is exposed from the insulative resin and formed, as one end of the conductive plate 24, on the opposite side of the pad 23a with the power board 19 interposed therebetween. A weld portion 24b is exposed from the insulative resin at the other end side of the conductive plate 24, and a capacitor 22 for absorbing ripples of the motor current is electrically connected to this weld portion 24b by welding. By disposing the capacitor 22 in this location, the distance between the capacitor 22 and power board 19 is shortened, so that the ripple components of the motor current flowing through the power board 19 can be effectively absorbed.

Moreover on the circuit casing 27, pads (not shown) that are connected with the power board 19 by wire bonding and serve as signal terminals through which a signal is input to and/or output from the control board 20 are exposed from the insulative resin and formed as one end of the conductive plates 26. Soldering portions 26a are exposed from the insulative resin on the other end side of the conductive plates, and those soldering portions 26a are inserted into through-holes made in the control board 20 and then soldered, so that wiring patterns on the power board 19 are electrically connected with those on the control board 20. Thereby, the semiconductor switching elements 30, the shunt resisters (not shown), etc. on the power board 19 are electrically connected with the electronic circuits on the control board 20.

Furthermore, connectors (not shown) are integrally molded with the circuit casing 27. Those connectors include a power connector 33 that is electrically connected to a vehicle battery (not shown), a signal connector portion (not shown) through which a signal is input to and/or output from the vehicle main body via external wiring, and a torque sensor connector portion (not shown) through which a signal is input to and/or output from the torque sensor (not shown) via external wiring. The connector housings of those connector portions are integrally molded with the insulative resin of the circuit casing 27, and in addition terminal members thereof are insert-molded. For example, a connector housing 33a of the power connector 33 is integrally molded with the insulative resin of the circuit casing 27. Moreover, one end of the insert-molded conductive plate 25 is exposed from the insulative resin as a connector terminal 25a that serves as a terminal member.

Moreover, a weld portion 25b is exposed from the insulative resin at the other end of the conductive plate 25, and to this weld portion 25b is electrically connected and welded one of the terminals of a coil 21 that prevents electromagnetic noise generated during operation of the semiconductor switching elements 30 from flowing outside.

A heatsink 28 is disposed on the opposite side of the reduction gear with respect to the rotor 4 of the electric motor 1. The power board 19 is disposed on the heatsink 28 on the opposite side of electric motor 1, tightly abutting on the heatsink. Moreover, the heatsink 28 is a casing disposed outside the motor terminal 10 and output terminal 23b, and a hole 28a is made through the heatsink 28. This hole 28a is made facing the portion where the motor terminal 10 is laser-welded with the output terminal 23b. As shown in FIG. 3, the laser beam is irradiated aiming at the inner circumferential edge of the hole 23c from outside the hole 28a, and then those terminals are laser-welded.

Moreover, the circuit casing 27 in which the coil 21 and capacitor 22 are mounted is fixed to the heatsink 28 on the control board 20 side. The capacitor 22 is disposed being sandwiched between the circuit casing 27 and heatsink 28, and heat generated from the capacitor 22 is dissipated to the heatsink 28. Thereby, the temperature of the capacitor 22 is inhibited from rising, so that reliability of the capacitor can be enhanced.

A holder 34 (refer to FIG. 4) is the other holding member that is made of the insulative resin and holds the motor terminal 10 and output terminal 23b, and a slit 34a is formed through this holder 34, in parallel to the axis of the electric motor 1. A chamfer is formed on both ends of the slit 34a to allow the motor terminal 10 and output terminal 23b to be easily inserted. Moreover, the weld portion of the motor terminal 10 with the output terminal 23b is distant from the holder 34, which is the other holding member, in the axial direction of the electric motor 1. Therefore, the insulative resin of the holder 34 can be prevented from eroding and deteriorating due to heat from the laser-welding or reflection of the laser beam.

The motor terminal 10 and output terminal 23b are inserted into the slit 34a of the holder 34, and furthermore the motor terminal 10 is inserted into the groove 27a of the circuit casing 27. At this time, the output terminal 23b overlaps the motor terminal 10 in the radial direction of the electric motor 1, with the output terminal disposed on the outer side and the motor terminal on the inner side of each other.

The dimensions of the slit 34a of the holder 34 and the groove 27a of the circuit casing 27 are set in such a way that the gap between the output terminal 23b and motor terminal 10 becomes less than 0.1 mm at the weld portion. The reason therefor is that weldability of laser-welding will be deteriorated with the gap exceeding 0.1 mm.

The weld portion of the motor terminal 10 with the output terminal 23b is located in a space 35 created by the heatsink 28, which is a casing, and the circuit casing 27 and holder 34, which are the holding members. The space communicates with its outside through the hole 28a that is made for irradiating the laser beam aiming at the output terminal 23b from outside the heatsink 28. Therefore, since any part except for the hole 28a is a sealed-off space, even if melted metal at the weld portion is spattered during the laser-welding, the spatter can be prevented from entering the interior of the electric motor 1 or the controller 11, owing to walls surrounding the space 35 created by the heatsink 28, the circuit casing 27 and the holder 34.

Moreover, the space 35 created by the circuit casing 27 and holder 34 is filled with silicone adhesive 36 that is an insulative resin (refer to FIG. 2). Thereby, spatter sticking on the walls surrounding the space 35 is prevented from coming off, and short-circuits can be prevented from occurring between neighboring terminals or between the terminals and the heatsink 35 caused by coming-off spatter.

Furthermore, by filling even the hole 28a of the heatsink 28 with the silicone adhesive 36, the interface between the heatsink 28 and circuit casing 27 and that between the heatsink 28 and holder 34 are sealed off by the silicone adhesive 36. Thereby, not only water but also dust can be prevented from entering the interior of the electric motor 1 or controller 11 from outside.

Furthermore, the electric motor 1 is separated by the heatsink 28 and circuit casing 27 from the space where parts for the controller 11 are housed; therefore, if any parts of the controller 11, solder balls, etc. come off, the coming-off parts will not enter the electric motor 1 interior, so that troubles such as rotation of the electric motor 1 locking up will not occur. Moreover, magnetic substance will never be attracted by the sensor permanent magnet 6 to stick to it.

Next will be explained assembling processes for the electric driving device according to Embodiment 1 configured as described above.

Firstly, the electric motor 1 is assembled. The permanent magnet 3 is bonded to the output shaft 2, and the sensor permanent magnet 6 magnetized with two poles is also bonded onto the shaft end face 2a on the opposite side of the output shaft. Following that, the permanent magnet 3 is magnetized with eight poles by a magnetizer, with reference to the magnetized position of the sensor permanent magnet 6, and then the inner ring of a bearing 37 is press-fitted, so as to form the rotor 4.

Next, the U-, V- and W-phase armature windings 9 are wound displaced from each other by 120° in electric angle, around the 12 protrusions 7 of the stator 5, interposing the insulator 8 therebetween, and each of the U-, V- and W-phases includes four windings, so that 12 windings are formed in total. Winding start wires of each of the U-phase windings are connected together, and winding end wires thereof are also connected together, so that the U-phase armature windings 9 are formed. Similarly, the V-phase and W-phase armature windings 9 are formed. The winding end wires of the U-phase, V-phase and W-phase armature windings 9 are connected together to make the neutral point. The not connected winding start wires of U-phase, V-phase and W-phase armature windings 9 are connected to the respective such terminals as the motor terminal 10. Following that, this stator is press-fitted into the motor casing 12.

Next, after the outer ring of a bearing 38 is fixed to the bracket 13, the output shaft 2 of the rotor 4 is press-fitted into the inner ring of the bearing 38. Following that, the coupling 18 is press-fitted onto the output shaft 2.

Next, Assembling of the controller 11 will be explained.

Firstly, high current parts, such as the semiconductor switching elements 30 and shunt resisters (not shown), are connected to the power board 19 by soldering. Then the power board 19 is bonded to the heatsink 28 with high heat-conductive adhesive.

Next, after applying cream solder to electrodes each on the control board 20 on the cover 29 side, the microcomputer 31 and other low current parts such as peripheral circuit elements around the microcomputer are mounted, the cream solder is melted by a reflow soldering machine, and then the foregoing parts are soldered.

Next, after applying the cream solder to electrodes each on the control board 20 on the circuit casing 27 side, low current parts constituting the magnetic sensor 32 and the control circuit are mounted, the cream solder is melted by the reflow soldering machine, and then the foregoing parts are soldered.

Next, a terminal of the capacitor 22 is welded to the weld portion 24b exposed from the insulative resin of the circuit casing 27. Then, one of the terminals of the coil 21 is welded to the weld portion 25b exposed from the insulative resin, as well as the other terminal of the coil 21 is also welded to a weld portion (not shown) exposed from the insulative resin. Following that, the circuit casing 27 to which the capacitor 22 and coil 21 are welded is assembled to the heatsink 28.

Next, the top surfaces (source) of the semiconductor switching elements 30 in the form of bare chips are electrically connected by wire bonding to the respective patterns on the power board 19. Furthermore, patterns on the power board 19 are electrically connected by wire bonding with the pads 23a and 24a and pads serving as signal terminals (not shown) exposed from the insulative resin of the circuit casing 27.

Next, the soldering portions 26a, terminals of the signal connector portion (not shown), terminals of the torque sensor connector portion (not shown), etc. that are exposed from the insulative resin of the circuit casing 27 are inserted into through-holes of the control board 20 and soldered. The wiring patterns on the power board 19 are electrically connected with those on the control board 20 in this way. Following that, the cover 29 is bonded to the circuit casing 27 with adhesive.

Next, the electric motor 1 and the controller 11 that have been assembled separately are assembled together.

Firstly, the holder 34 is inserted onto the end of the output terminal 23b of the controller 11, and then the controller is fastened with screws (not shown) to the motor casing 12 to which the stator 5 is press-fitted. At this time, the motor terminal 10 is inserted into the slit 34a of the holder 34 with the output terminal 23b disposed on the outer side and the motor terminal 10 on the inner side of each other in the radial direction of the electric motor 1. Then, the motor terminal 10 is inserted into the groove 27a of the circuit casing 27, so that the motor terminal 10 and output terminal 23b are made to overlap each other.

Next, the motor casing 12 attached with the controller 11 is mounted on the bracket 13 while the rotor 4 being inserted inside the stator 5, and fastened thereto with screws (not shown).

Next, the laser beam is irradiated aiming at the inner circumferential edge of the hole 23c from outside the hole 28a, and those terminals are thereby laser-welded with each other. Following that, the space 35 created by the circuit casing 27 and holder 34 and the hole 28a of the heatsink 28 are filled with the silicone adhesive 36, the silicone adhesive 36 is hardened, and the assembling of the electric driving device is completed.

As described above, the electric driving device according to Embodiment 1 includes the controller 11 disposed coaxially with the axis of the electric motor 1 rotation shaft, the motor terminal 10 whose end extends from the electric motor 1 toward the controller 11 and the output terminal 23b whose end extends from the controller 11 toward the electric motor 1, wherein the portion of the motor terminal 10 including the end thereof and that of the output terminal 23b including the end thereof each are formed to extend in parallel to the axial direction of the electric motor 1, and overlappingly connected with each other.

Therefore, the radial dimension of the electric motor 1 is shortened, so that reduction in device size can be achieved. Moreover, since the extending direction of the motor terminal 10 and output terminal 23b is configured to be in parallel to the assembling direction of the electric motor 1 and controller 11, workability of the device can be enhanced.

Moreover, since the end of the motor terminal 10 is configured to extend from the electric motor 1 toward the controller 11, as well as the end of the output terminal 23b is configured to extend from the controller 11 toward the electric motor 1, the total length of the motor terminal 10 and output terminal 23b becomes shorter, and thereby the current path through which the motor current flows becomes shorter, so that its electric resistance can be decreased, enhancing the device performance.

Moreover, since the motor terminal 10 and output terminal 23b are overlappingly connected with each other in the radial direction of the electric motor 1, the radial dimension of the electric motor 1 becomes shorter, thereby achieving reduction in device size.

Moreover, since the motor terminal 10 and output terminal 23b are connected with each other by welding, reliability of the electrical connection of the device can be enhanced. Moreover, parts for fastening such as screws are eliminated, so that reduction in costs of the device can be achieved.

Moreover, since the motor terminal 10 and output terminal 23b are connected with each other by laser-welding, reliability of the electrical connection of the device as well as workability of welding can be enhanced. Moreover, the space required for the weld portion is reduced, so that reduction in device size can be achieved.

Moreover, since the motor terminal 10 and output terminal 23b are connected with each other by laser-welding radially from outside the electric motor 1, workability of welding can be enhanced, and in addition the space required for the weld portion can be reduced, so that reduction in device size can be achieved.

Moreover, the heatsink 28 is provided, which is a casing disposed outside the motor terminal 10 and output terminal 23b, and the hole 28a is made in the heatsink 28, facing the portion where the motor terminal 10 is connected with the output terminal 23b. Therefore, the laser beam can be irradiated froth outside the hole 28a aiming at the weld portion to laser-weld those terminals, so that workability of the laser-welding can be enhanced.

Moreover, the electric driving device is provided with the holder 34 and circuit casing 27, which are made of the insulative resin and are the holding members for holding the motor terminal 10 and output terminal 23b, the slit 34a is formed in the holder 34, as well as the groove 27a is formed in the circuit casing 27, the motor terminal 10 and output terminal 23b are inserted into the slit 34a of the holder 34, and furthermore the motor terminal 10 is inserted into the groove 27a of the circuit casing 27. Therefore, the motor terminal 10 and output terminal 23b are made to overlap each other, so that reliability of the weld portion by the laser-welding can be enhanced.

Moreover, the weld portion where the motor terminal 10 is connected with the output terminal 23b is distant from the holder 34 and circuit casing 27, which are the holding members. Therefore, the insulative resin of the circuit holder 34 can be prevented from eroding and deteriorating due to heat from the laser-welding or reflection of the laser beam, so that reliability of the device can be enhanced.

Moreover, the laser-weld portion where the motor terminal 10 is connected with the output terminal 23b is located in the space 35 created by the heatsink 28, which is a casing, and the holder 34 and circuit casing 27, which are the holding members, and the space communicates with its outside through the hole 28a. Therefore, since any part except for the hole 28a is a sealed-off space, even if melted metal at the weld portion is spattered during the laser-welding, the spatter can be prevented from entering the interior of the electric motor 1 or the controller 11 owing to the walls surrounding the space 35 created by the heatsink 28, the circuit casing 27 and the holder 34, so that reliability of the device can be enhanced.

Moreover, since the space 35 is filled with the silicone adhesive 36, spatter sticking on the walls surrounding the space 35 is prevented from coming off, and short-circuits between neighboring terminals or between the terminals and the heatsink 28 caused by coming-off spatter can be prevented, so that reliability of the device can be enhanced.

Furthermore, by filling the hole 28a of the heatsink 28, which is a casing, with the silicone adhesive 36 that is the same as the one used for filling the space 35, the interface between the heatsink 28 and circuit casing 27 and that between the heatsink 28 and holder 34 are sealed off by the silicone adhesive 36. Therefore, water can be prevented from entering the interior of the electric motor 1 or controller 11 from outside, so that waterproof property of the device can be enhanced. In addition, dust can be prevented from entering the interior of the electric motor 1 or controller 11 from outside, so that dustproof property of the device can be enhanced. Furthermore, since the space 35 and hole 28a are filled with the same silicone adhesive 36, the silicone adhesive 36 can be applied at once, so that workability can be enhanced.

Moreover, the hole 23c is made in either one of the motor terminal 10 and output terminal 23b, for example, the output terminal 23b, and the inner circumference of this hole is connected by laser-welding; therefore, a laser-welding state after the welding can be made sure by inspecting the melting state of the inner circumferential edge of the hole 23c and the surface of the motor terminal 10, so that reliability of laser-welding can be enhanced.

Moreover, the crank-shaped bent section 10a is formed on at least one of the motor terminal 10 and output terminal 23b, for example, the motor terminal 10. The motor terminal 10 is connected to the output terminal 23b on the tip side of this bent section 10a. Thereby, the bent section serves as an elastic member, which relieves stress at the weld portion due to difference in the coefficient of linear expansion of each of the parts during the laser-welding or in the temperature environment of the device being used, so that durability of the weld portion against temperature change can be increased, thereby enhancing reliability of the device.

Incidentally, a magnetic resistance element is used for the magnetic sensor 32 in Embodiment 1 described above; however it is not limited to the magnetic resistance element, but another magnetic detection element such as a Hall IC may be used.

Embodiment 2

Figure 5:
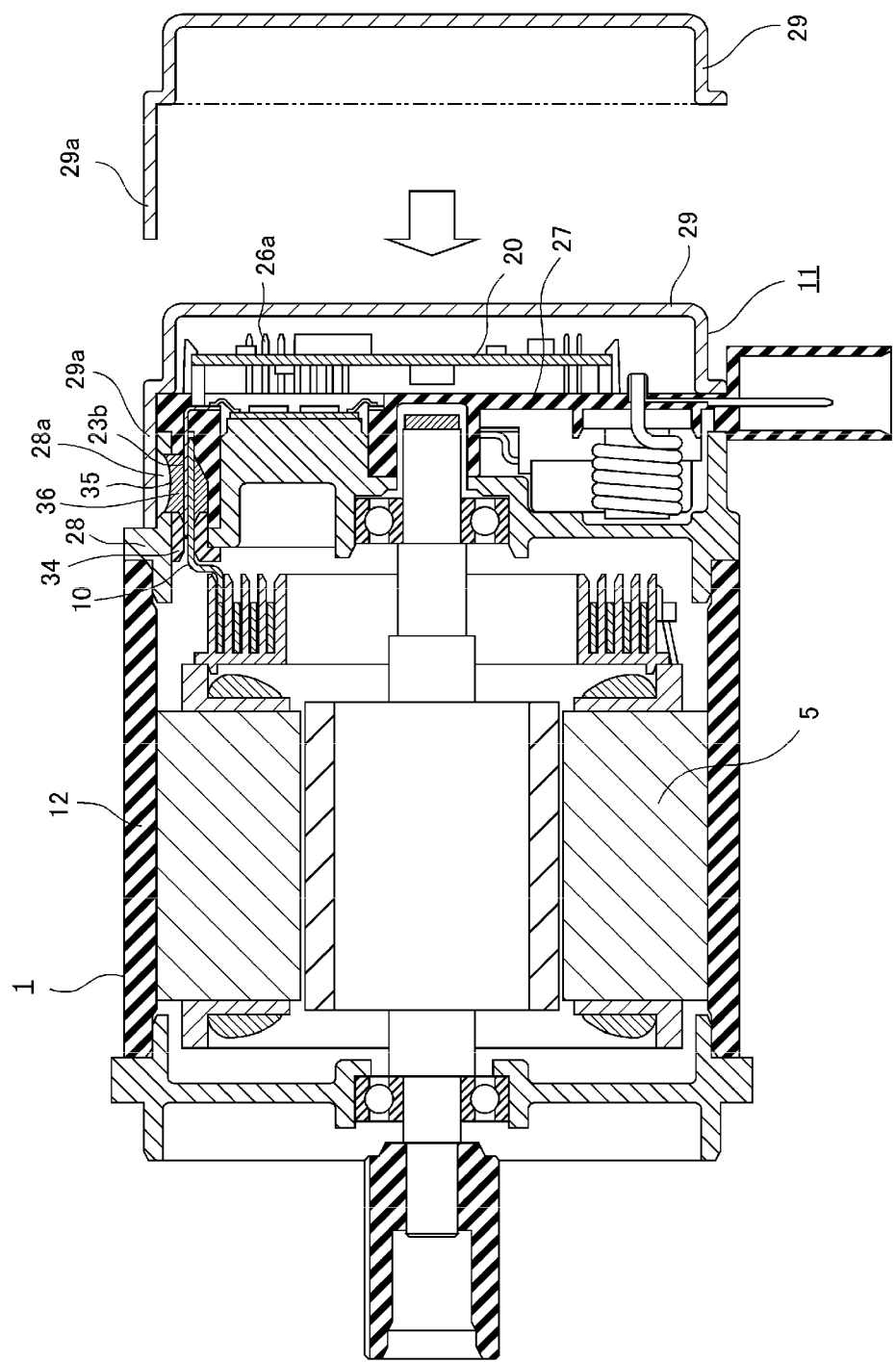
FIG. 5 is a cross-sectional view of an electric driving device according to Embodiment 2 of the invention.

An electric driving device according to Embodiment 2 of the present invention will be explained next. FIG. 5 is a cross-sectional view showing the electric driving device according to Embodiment 2. As shown in FIG. 5, the cover 29 is provided with an extension 29a in the electric driving device according to Embodiment 2. Moreover, the extension 29a of the cover 29 covers the outside of the hole 28a of the heatsink 28, which is a casing. Incidentally, configuration other than the above is the same as that of Embodiment 1; so the same reference numerals are given to only necessary parts.

The electric driving device according to Embodiment 2 is configured as described above, which is assembled by the following assembling processes. The device of Embodiment 2 is assembled the same as that of Embodiment 1 up to the process in which the soldering portions 26a exposed from the insulative resin of the circuit casing 27 are inserted into the through-holes in the control board 20, and then soldered; however in Embodiment 2, the electric motor 1 and controller 11 that have been separately assembled are assembled in the following process.

Moreover, the processes from inserting the holder 34 onto the end of the output terminal 23b of the controller 11 and then fixing it to the motor casing 12 into which the stator 5 is press-fitted to the process of filling the space 35 and the hole 28a with the silicone adhesive 36 and then hardening the silicone adhesive are the same as the assembling processes for Embodiment 1. Following that, the cover 29 is bonded to the circuit casing 27 with adhesive.

In the electric driving device according to Embodiment 2, the cover 29 is provided with the extension 29a, and the extension covers the outside of the hole 28a of the heatsink 28, which is a casing. Therefore, even if flowing water is splashed to the device by, for example, a high-pressure car washer, the water can be blocked off by the extension 29a of the cover 29, and the silicone adhesive 36 does not come off from the heatsink 28; therefore, water and the like can be prevented from entering the interior of the device from outside, so that waterproof property of the device can be enhanced.

Incidentally, in the foregoing Embodiments 1 and 2, a casing provided outside the motor terminal 10 and output terminal 23b has been explained as the heatsink 28; however, it may be possible that the surface of the motor casing 12 abutting on heatsink 28 is moved toward the opposite side of the output shaft 2 (rear end side), the casing is made to serve as the motor casing 12, and the hole 28a is made in the motor casing 12.

Embodiment 3

Figure 6:
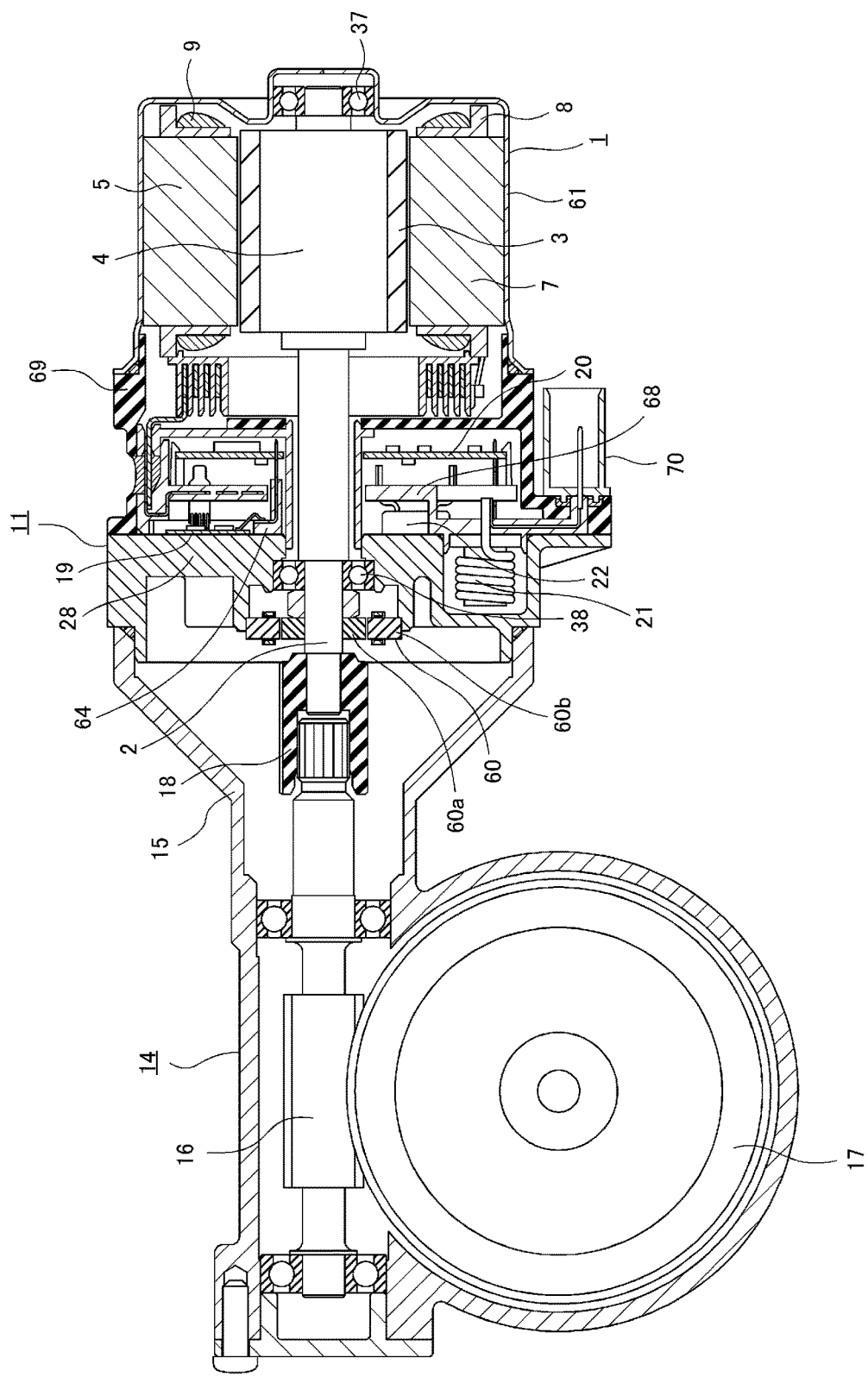
FIG. 6 is a cross-sectional view showing an electric power steering apparatus equipped with an electric driving device according to Embodiment 3 of the invention.
Figure 7:
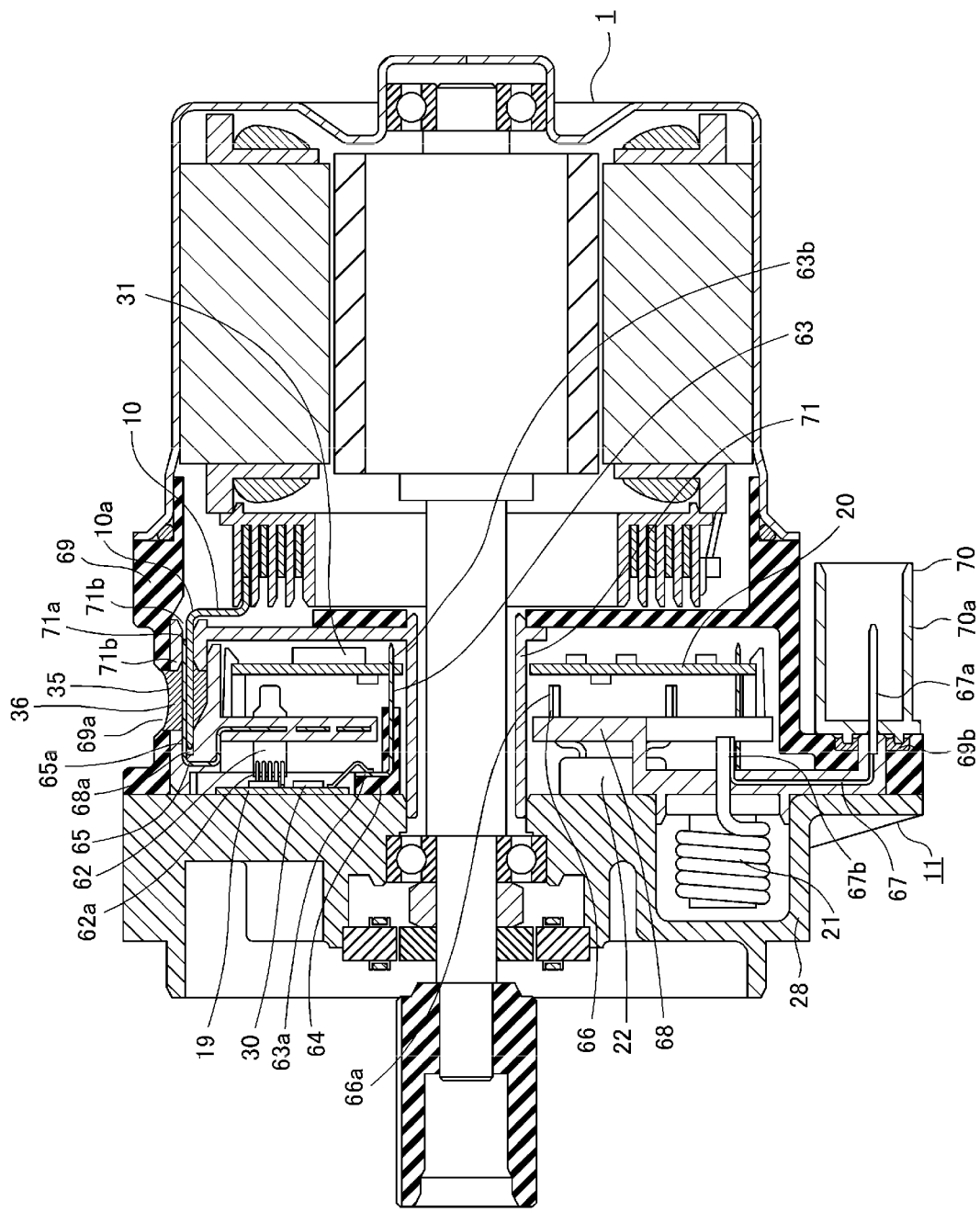
FIG. 7 is a cross-sectional view of the electric driving device according to Embodiment 3 of the invention.

Next will be explained an electric driving device according to Embodiment 3 of the present invention and an electric power steering apparatus equipped with the same. FIG. 6 is a cross-sectional view showing the electric power steering apparatus according to Embodiment 3; FIG. 7 is a cross-sectional view of the electric driving device according to Embodiment 3. Here in those figures, explanation will be made giving the same reference numerals to the same or corresponding parts in Embodiments 1 and 2.

In the electric driving device according to Embodiment 3, the controller 11 is located on the output shaft 2 side of the electric motor 1. In FIG. 6 and FIG. 7, a rotational position sensor 60 of the electric motor 1 comprises a resolver, which includes a resolver rotor 60a and a resolver stator 60b. The outer diameter of the resolver rotor 60a is formed in a special curve such that the permeance of the radial gap between the resolver stator 60b and resolver rotor 60a varies sinusoidally according to rotor angle. An exciting coil and two pairs of output coils are wound around the resolver stator 60b, which detect variation in the radial gap between the resolver stator 60b and resolver rotor 60a, and output two output voltages in different phases each varying sinusoidally and cosinusoidally. Here, the stator 5 is press-fitted into a yoke 61 made of iron.

The controller 11 includes: the power board 19; the control board 20; the coil 21; the capacitor 22 (2200 μF×3 or so); a terminal base 64 in which a plurality of conductive plates 62, 63, etc. is insert-molded in the insulative resin; a circuit casing 68 in which a plurality of conductive plates 65, 66, 67, etc. is insert-molded in the insulative resin; the heatsink 28; and a housing 69 that is made of aluminum and provided surrounding the control board 20 and circuit casing 68.

The yoke 61 into which the stator 5 is press-fitted is fastened to the housing 69 with screws (not shown). Moreover, the heatsink 28 of the controller 11 is fixed to the gearbox 15 of the reduction gear 14.

The foregoing control board 20 is made of a multilayer glass epoxy board (for example, four layers), and on which are mounted and soldered the microcomputer 31, peripheral circuit elements (low current parts) including the drive circuit (not shown) and motor current detection circuit (not shown), etc. The microcomputer 31 computes assisting torque based on a steering torque signal from the torque sensor (not shown), and in addition it feeds back the motor current flowing through the electric motor 1 detected by the current detection circuit (not shown) via one end of the shunt resisters (not shown), and the rotational position of the rotor 4 detected by the rotational position sensor 60, and thereby computes the current corresponding to the assisting torque. Then the microcomputer 31 is set to output a drive signal for controlling the semiconductor switching elements 30 of the bridge circuit.

Moreover, although not shown in the figure, the microcomputer 31 includes a well-known self-diagnosing function in addition to an AD converter, a PWM timer circuit, etc., and always self-diagnoses whether or not the system is operating properly. If any abnormality occurs, the motor current can be interrupted.

In the terminal base 64, the conductive plate 62 to be electrically connected to a conductive plate of the circuit casing 68 and the conductive plate 63 to be electrically connected to the control board 20 are insert-molded in the insulative resin. One end of the conductive plates 62 and 63 each is exposed from the insulative resin, and on which are formed a pad 62a and pad 63a, respectively, for connecting those to the power board 19 by wire bonding.

The conductive plate 65 in the circuit casing 68 is formed with one end thereof exposed from the insulative resin, and electrically connected by resistance welding with the conductive plate 62 of the terminal base 64. Therefore, the conductive plate 65 is electrically connected to the power board 19 via the conductive plate 62 and an aluminum wire for wire bonding. An output terminal 65a is formed on the other end of the conductive plate 65. This output terminal 65a is formed in such a way that the end of the terminal extends toward the electric motor 1, in parallel to the axial direction of the electric motor 1.

Moreover, in the circuit casing 68, which is one of the holding members, a groove 68a is formed at the portion where the output terminal 65a projects from the insulative resin, in a location on the inner side of the electric motor 1 in a radial direction thereof, and the motor terminal 10 is inserted into this groove 68a. Moreover, an oblong hole is made through the output terminal 65a, the same as Embodiment 1, and the laser beam is irradiated aiming at the inner circumferential edge of the hole from outside in the radial direction of the electric motor 1, with the output terminal 65a overlapping the motor terminal 10, and then those terminals are laser-welded.

In this way, the output terminal 65a and motor terminal 10 are electrically connected with each other by laser-welding. At this time, the weld portion is located on the tip side of the bent section 10a of the motor terminal 10. Moreover, the weld portion of the motor terminal 10 with the output terminal 65a is distant from the casing 68, which is the one of the holding members, in both the radial and axial directions of the electric motor 1. Therefore, the insulative resin of the circuit casing 68 can be prevented from eroding and deteriorating due to heat from the laser-welding or reflection of the laser beam.

Moreover although not shown in the figure, the conductive plate 66 is formed in the circuit casing 68, with one end thereof exposed from the insulative resin, and electrically connected with the conductive plate 62 of the terminal base 64 by resistance welding. Therefore, the conductive plate 66 is electrically connected to the power board 19 via the conductive plate 62 and an aluminum wire for wire bonding.

As shown in FIG. 7, a weld portion 66a is exposed from the insulative resin on the other end side of the conductive plate 66, and to this weld portion 66a is electrically connected by welding the capacitor 22 for absorbing ripples of the motor current.

Moreover in the terminal base 64, a pad 63a, which serves as a signal terminal being connected with the power board 19 by wire bonding and through which a signal is input to and/or output from the control board 20, is exposed from the insulative resin and formed as one end of the conductive plate 63. In addition, a soldering portion 63b is exposed from the insulative resin on the other end side of the conductive plate 63, and this soldering portion 63b is inserted into a through-hole made in the control board 20 and then soldered, so that a wiring pattern on the power board 19 is electrically connected with that on the control board 20. Thereby, the semiconductor switching elements 30, the shunt resisters (not shown), etc. on the power board 19 are electrically connected with the electronic circuit on the control board 20.

A connector is attached to the housing 69. This connector includes a power connector 70 that is electrically connected to the vehicle battery (not shown), the signal connector portion (not shown) through which a signal is input to and/or output from the vehicle main body via external wiring, and the torque sensor connector portion (not shown) through which a signal is input to and/or output from the torque sensor (not shown) via external wiring. The connector housings of those connectors are integrally molded with the insulative resin, and terminal members thereof are insert-molded into the insulative resin of the circuit casing 68. Then, the terminal members are inserted into the integrally-molded connector housing so as to constitute the connector. For example, a connector housing 70a of the power connector 70 is integrally molded together with the signal connector portion (not shown) and the torque sensor connector portion (not shown) using the insulative resin. Moreover, one end of the conductive plate 67 insert-molded in the circuit casing 68 is exposed from the insulative resin as a connector terminal 67a that serves as a terminal member.

Moreover, a weld portion 67b is exposed from the insulative resin of the circuit casing 68, at the other end of the conductive plate 67, and to this weld portion 67b is welded and electrically connected one end of the coil 21 that prevents electromagnetic noise generated during operation of the semiconductor switching elements 30 from flowing outside.

The heatsink 28 is disposed on the output shaft 2 side of the electric motor 1. The power board 19 is disposed on the electric motor 1 side of this heatsink 28, tightly abutting on the heatsink. Moreover, the terminal base 64 is fixed on the heatsink 28 near the power board 19. Furthermore, the circuit casing 68 in which the coil 21 and capacitor 22 are mounted is fixed to the heatsink 28 on the control board 20 side thereof.

The coil 21 and capacitor 22 are disposed being housed in the holes made in the heatsink 28 (hole for capacitor 22 not shown), and heat from the coil 21 and capacitor 22 is dissipated to the heatsink 28. Thereby, the temperature of the coil 21 and capacitor 22 is inhibited from rising, so that reliability of the coil and capacitor can be enhanced. At this time, the gaps between the holes of the heatsink 28 (hole for capacitor 22 not shown) and the coil 21 and capacitor 22 are filled with high heat-conductive adhesive or grease, which enhances heat dissipation from the coil 21 and capacitor 22. Moreover, since the heatsink 28 is fixed to the gearbox 15, heat from the semiconductor switching elements 30, coil 21 and capacitor 22 is dissipated to the heatsink 28, and then further dissipated to the gearbox 15. Thereby, heat dissipation capability of the controller 11 can be enhanced.

Moreover, the housing 69 is a casing disposed outside the motor terminal 10 and output terminal 65a, and a hole 69a is made through the housing 69. This hole 69a is made facing the portion where the motor terminal 10 is laser-welded with the output terminal 65a. The laser beam is irradiated from outside the hole 69a aiming at the inner circumferential edge of the hole made in the output terminal 65a, and then those terminals are laser-welded with each other.

A holder 71, which is the other holding member, is molded using the insulative resin, and holds the motor terminal 10 and output terminal 65a in cooperation with the circuit casing 68. A slit 71a is formed through this holder 71 in parallel to the axial direction of the electric motor 1. A chamfer 71a is formed on both ends of this slit 71a to allow the motor terminal 10 and output terminal 65a to be easily inserted.

Moreover, the weld portion of the motor terminal 10 with the output terminal 65a is distant from the holder 71, which is one of the holding members, in the axial direction of the electric motor 1. Therefore, the insulative resin of the holder 71 can be prevented from eroding and deteriorating due to heat from the laser-welding or reflection of the laser beam.

The motor terminal 10 and output terminal 65a are inserted into the slit 71a of the holder 71, and in addition the motor terminal 10 is further inserted into the groove 68a of the circuit casing 68. At this time, the output terminal 65a overlaps the motor terminal 10 in the radial direction of the motor, with the output terminal 65a disposed on the outer side and the motor terminal 10 on the inner side of each other. Incidentally, the dimensions of the slit 71a and groove 68a are set in such a way that the gap between the output terminal 65a and motor terminal 10 becomes less than 0.1 mm at the weld portion.

The laser-weld portion of the motor terminal 10 with the output terminal 65a is located in the space 35 created by the housing 69, which is a casing, and the circuit casing 68 and holder 71, which are the holding members. The hole 69a is made for irradiating the laser beam aiming at the output terminal 65a from outside the housing 69. This space 35 communicates with its outside through the hole 69a. Therefore, since any part except for the hole 69a is a sealed-off space, even if melted metal at the weld portion is spattered during the laser-welding, the spatter can be prevented from entering the interior of the electric motor 1 or the controller 11, owing to walls surrounding the space 35 created by the housing 69, circuit casing 68 and holder 71.

Moreover, the space 35 is filled with the silicone adhesive 36. Thereby, spatter sticking on the walls surrounding the space 35 is prevented from coming off, and short-circuits between neighboring terminals or between the terminals and housing 69 can be prevented.

Furthermore, by filling even the hole 69a of the housing 69 with the silicone adhesive 36, the interface between the housing 69 and circuit casing 68 and that between the housing 69 and holder 71 are sealed off by the silicone adhesive 36. Thereby, water and dust can be prevented from entering the interior of the electric motor 1 or the controller 11 from outside.

Furthermore, the electric motor 1 is separated by the housing 69 and holder 71 from the space where parts of the controller 11 are housed; therefore, even if any parts of the controller 11, solder balls, etc. come off, the coming-off parts will not enter the interior of the electric motor 1, so that troubles such as rotation of the electric motor 1 locking up will not occur.

Next will be explained assembling processes for the electric driving device according to Embodiment 3 configured as described above.

Firstly, the electric motor 1 is assembled. After bonded to the output shaft 2, the permanent magnet 3 is magnetized with eight poles by a magnetizer, and then the inner ring of the bearing 37 is press-fitted onto the shaft, so as to form the rotor 4.

Next, similarly to Embodiment 1, the armature windings 9 for the U-, V- and W-phases are wound around the stator 5, and then the armature windings 9 for each of the U-, V- and W-phases are connected together. The winding start wires of the U-, V- and W-phases are connected to the respective such terminals as the motor terminal 10. Following that, this stator 5 is press-fitted into the yoke 61.

Figure 8:
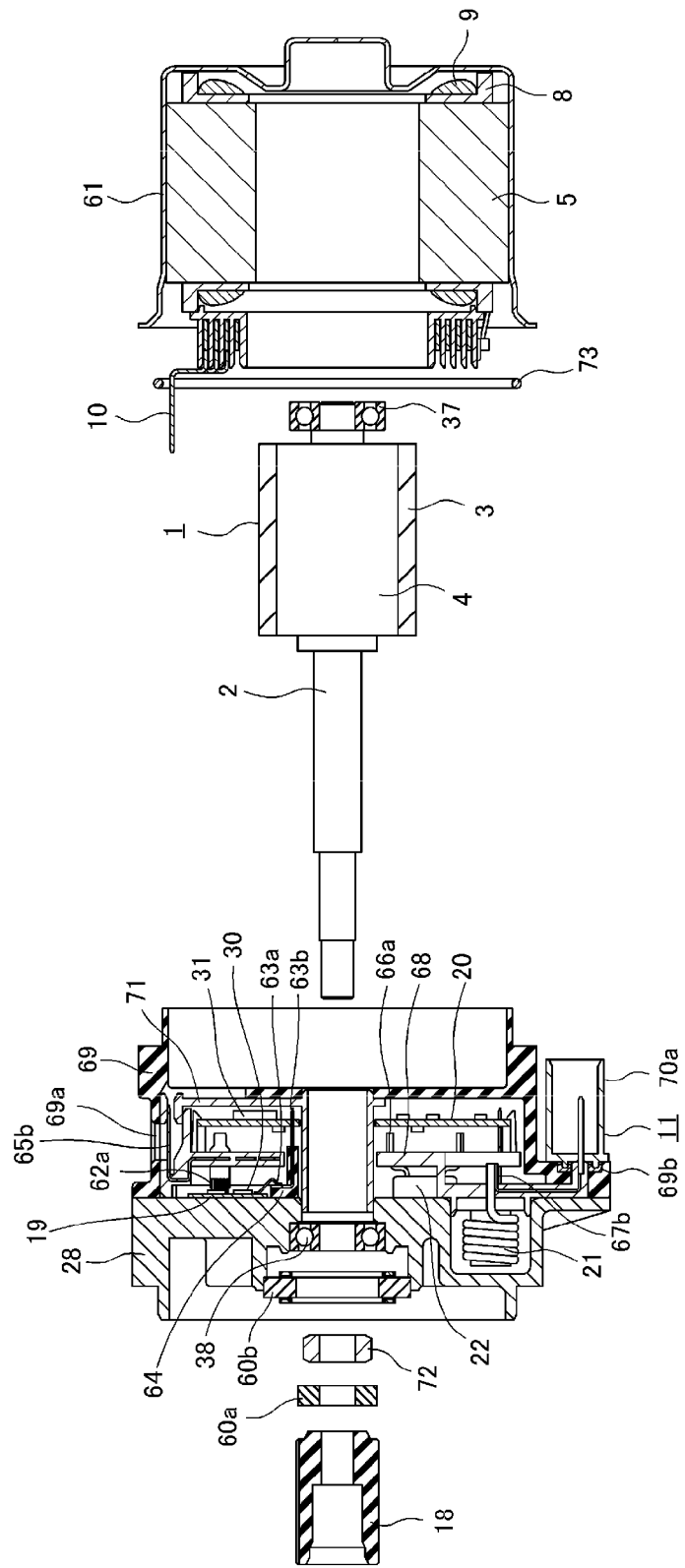
FIG. 8 is an exploded view of the electric driving device according to Embodiment 3 of the invention.

Assembling of the controller 11 will be explained next referring to FIG. 8. FIG. 8 is an exploded view of the electric driving device according to Embodiment 3.

Firstly, high current parts, such as the semiconductor switching elements 30 and the shunt resisters (not shown), are connected to the power board 19 by soldering.

Next, after applying cream solder to electrodes each on the electric motor 1 side of the control board 20, the microcomputer 31 and other low current parts such as peripheral circuit elements are mounted, the cream solder is melted by the reflow soldering machine, and then the foregoing parts are soldered.

Following that, after applying the cream solder to electrodes each on the circuit casing 68 side of the control board 20, low current parts constituting the control circuit are mounted, the cream solder is melted by the reflow soldering machine, and then the foregoing parts are soldered.

Next, the outer ring of the bearing 38 is fixed to the heatsink 28. Then the power board 19 is bonded to the heatsink 28 with the high heat-conductive adhesive. At the same time, the terminal base 64 is bonded to the heatsink 28 with the adhesive.

Following that, the top surfaces (source) of the semiconductor switching elements 30 in the form of bare chips are electrically connected by wire bonding to the respective patterns on the power board 19. Furthermore, patterns on the power board 19 are electrically connected by wire bonding to the pads 62a and 63a exposed from the insulative resin of the terminal base 64.

Next, a terminal of the capacitor 22 is welded to the weld portion 66a exposed from the insulative resin of the circuit casing 68. Then, one of the terminals of the coil 21 is welded to the weld portion 67b exposed from the insulative resin, and also the other terminal of the coil 21 is welded to another weld portion (not shown) exposed from the insulative resin.

Following that, the resolver stator 60b is fastened to the heatsink 28 with screws (not shown). Next, the circuit casing 68 to which the capacitor 22 and coil 21 are welded is fastened to the heatsink 28 with screws (not shown).

Next, the soldering portion 63b, terminals of the signal connector portion (not shown), terminals of the torque sensor connector portion (not shown), etc. that are exposed from the insulative resin of the terminal base 64 are inserted into through-holes of the control board 20 and soldered. In this way, wiring patterns on the power board 19 are electrically connected with those on the control board 20.

Next, the holder 71 is fastened to the housing 69 with screws (not shown). Following that, liquid gasket is applied to the surfaces of the heatsink 28 and housing 69 abutting on each other, and the housing 69 is fastened to the heatsink 28 with screws (not shown). Then adhesive is applied to the groove 69b of the housing 69, and the connector housing in which the connector housing 70a etc. are integrally molded is fastened to the housing 69 with screws (not shown).

Next, the electric motor 1 and the controller 11 that have been assembled separately are assembled together.

Firstly, the output shaft 2 of the rotor 4 is press-fitted into the inner ring of the bearing 38 fixed to the heatsink 28. Following that, a spacer 72 is inserted onto the output shaft 2, and then the resolver rotor 60a is press-fitted onto the output shaft 2. Furthermore, the coupling 18 is press-fitted onto the output shaft 2. Next, a rubber ring 73 is attached to the outer circumferential end of the housing 69, and the yoke 61 to which the stator 5 is assembled is fastened to the housing 69 with screws (not shown).

Next, the laser beam is irradiated from outside the hole 69a aiming at the inner circumferential edge of the hole 23c made in the output terminal 65a, and then the terminal is laser-welded. Following that, the space 35 created by the circuit casing 68 and holder 71 and the hole 69a of the housing 69 are filled with the silicone adhesive 36, the silicone adhesive 36 is hardened, and the assembling of the electric driving device is completed.

As described above, the electric driving device according to Embodiment 3 includes the controller 11 disposed coaxially with the axis of the rotation shaft of the electric motor 1, the motor terminal 10 whose end extends from the electric motor 1 toward the controller 11 and the output terminal 65a whose end extends from the controller 11 toward the electric motor 1, wherein a portion of the motor terminal 10 including the end thereof and that of the output terminal 23b including the end thereof each are formed to extend in parallel to the axial direction of the electric motor 1, and overlappingly connected with each other.

Therefore, the radial dimension of the electric motor 1 is shortened, so that the device can be reduced in size. Moreover, since the extending direction of the motor terminal 10 and the output terminal 65a is configured to be in parallel to the assembling direction of electric motor 1 and the controller 11, workability of the device can be enhanced.

Moreover, since the end of the motor terminal 10 is configured to extend from the electric motor 1 toward the controller 11, as well as the end of the output terminal 65a is configured to extend from the controller 11 toward the electric motor 1, the total length of the motor terminal 10 and output terminal 65a is shortened, and the current path through which the motor current flows becomes shorter, so that the electric resistance of the path can be decreased, thereby enhancing the performance of the device.

Moreover, since the motor terminal 10 and output terminal 65a are overlappingly connected with each other in the radial direction of the electric motor 1, the radial dimension of the electric motor 1 is shortened, thereby achieving reduction in device size.

Moreover, since the motor terminal 10 and output terminal 65a are connected with each other by welding, reliability of the electrical connection of the device can be enhanced. Moreover, parts for fastening such as screws are eliminated, so that device costs can be reduced.

Moreover, since the motor terminal 10 and output terminal 65a are connected with each other by laser-welding, reliability of the electrical connection of the device as well as workability of welding can be enhanced. Moreover, the space required for the weld portion is reduced, so that reduction in device size can be achieved.

Moreover, since the motor terminal 10 and output terminal 65a are connected with each other by laser-welding from outside the electric motor 1 in the radial direction thereof, the space required for the weld portion can be reduced, as well as workability of laser-welding can be enhanced, so that reduction in device size can be achieved.

Moreover, the housing 69, which is a casing, is provided being disposed outside the motor terminal 10 and output terminal 65a, the hole 69a is made in the housing 69, facing the portion where the motor terminal 10 is connected with the output terminal 65a. Therefore, the laser beam is irradiated from outside the hole 69a aiming at the weld portion to laser-weld those terminals, so that workability of the laser-welding can be enhanced.

Moreover, the holder 71 and circuit casing 68 are provided, which are made of the insulative resin and are the holding members for holding the motor terminal 10 and output terminal 65a, the groove 68a is formed in the circuit casing 68 as well as the slit 71a is formed in the holder 71, the motor terminal 10 and output terminal 65a are inserted into the slit 71a of the holder 71, and furthermore the motor terminal 10 is inserted into the groove 68a of the circuit casing 68. Therefore, the output terminal 65a and the motor terminal 10 are made to overlap each other, so that reliability of the weld portion by the laser-welding can be enhanced.

Moreover, since the weld portion where the motor terminal 10 is connected with the output terminal 65a is distant from the holder 71 and circuit casing 68, which are the holding members, the insulative resin of the holder 71 can be prevented from eroding and deteriorating due to heat from the laser-welding or reflection of the laser beam, so that reliability of the device can be enhanced.

Moreover, the laser-weld portion where the motor terminal 10 is connected with the output terminal 65a is located in the space 35 created by the housing 69, which is a casing, and the holder 71 and circuit casing 68, which are the holding members, and the space communicates with its outside through the hole 69a. Therefore, since any part except for the hole 69a is a sealed-off space, even if melted metal at the weld portion is spattered during the laser-welding, the spatter can be prevented from entering the interior of the electric motor 1 or the controller 11, owing to the walls surrounding the space 35 created by the housing 69, the circuit casing 68 and the holder 71, so that reliability of the device can be enhanced.

Moreover, since the space 35 is filled with the silicone adhesive 36, spatter sticking on the walls surrounding the space 35 is prevented from coming off, and short-circuits between neighboring terminals or between the terminals and the housing 69 caused by coming-off spatter can be prevented, so that reliability of the device can be enhanced.

Moreover, since the hole 69a of the housing 69, which is a casing, is filled with the same silicone adhesive 36 as that for the space 35, the interface between the housing 69 and circuit casing 68 and that between the housing 69 and holder 71 are sealed off by the silicone adhesive 36. Therefore, water can be prevented from entering the interior of the electric motor 1 or controller 11 from outside, so that waterproof property of the device can be enhanced. Moreover, dust can be prevented from entering the interior of the electric motor 1 or controller 11 from outside, so that dustproof property of the device can be enhanced. Furthermore, since the space 35 and hole 69a are filled with the same silicone adhesive 36, the silicone adhesive 36 can be applied at once, so that workability can be enhanced.

Moreover, the hole 23c is made in either one of the motor terminal 10 and output terminal 65a, for example, the output terminal 65a, and the inner circumference of this hole 23c is connected by laser-welding; therefore, a laser-welding state after the welding can be made sure by inspecting a melting state of the inner circumferential edge of the hole 23c and the surface of the motor terminal 10, so that reliability of laser-welding can be enhanced.

Moreover, the crank-shaped bent section 10a is formed on at least either one of the motor terminal 10 and output terminal 65a, for example, on the motor terminal 10, and the motor terminal 10 is connected with the output terminal 65a on the tip side of this bent section 10a. Thereby, the bent section 10a serves as an elastic member, which relieves stress at the weld portion due to difference in the coefficient of linear expansion of each of the parts during the welding or in a temperature environment of the device being used, so that durability of the weld portion against temperature change will be increased, thereby enhancing reliability of the device.

Moreover, the coil 21 and capacitor 22 are disposed being housed in the holes made in the heatsink 28 (hole for capacitor 22 not shown), and heat from the coil 21 and capacitor 22 is dissipated to the heatsink 28, so that heat dissipation capability of the device can be enhanced.

Moreover, the power board 19 on which heat-generating parts such as the semiconductor switching elements 30 are mounted is bonded to the heatsink 28 with the high heat-conductive adhesive, and in addition the coil 21 and capacitor 22 are disposed being housed in the holes made in the heatsink 28 (hole for capacitor 22 not shown), and the heatsink 28 is fixed to the gearbox 15. Therefore, heat generated from the semiconductor switching elements 30, coil 21, capacitor 22, etc. is dissipated to the gearbox through the heatsink 28, so that heat dissipation capability of the device can be enhanced.

Incidentally, in each of the foregoing embodiments, the number of poles of the permanent magnet 3 is made eight and the number of protrusions of the stator 5 is made 12; however it is not limited to this combination, but other numbers of poles and other numbers of protrusions may be combined.

Moreover, the electric motor 1 is not limited to a blushless motor, but it may be an induction motor or a switched reluctance motor (SR motor).

Moreover, the armature windings 9 of the electric motor 1 have been explained as being star-connected; however they may be delta-connected.

Moreover, the motor terminal 10 and output terminal 23b or 65a overlap each other in the radial direction of the motor 1, with the output terminals 23b or 65a disposed on the outer side and the motor terminal 10 on the inner side of each other; however they may overlap with the motor terminal 10 disposed on the outer side and the output terminal 23b or 65a on the inner side. At this time, the hole 23a is made in the motor terminal 10.

Various modifications and alterations of this invention will be apparent to those skilled in the art without departing from the scope and spirit of this invention, and it should be understood that this is not limited to the illustrative embodiments set forth herein.

What is claimed is:

1. An electric driving device, comprising:
   an electric motor;
   a controller that is disposed coaxially with an axis of the electric motor rotation shaft and takes control of driving the electric motor;
   a motor terminal whose end extends from the electric motor toward the controller;

an output terminal whose end extends from the controller toward the electric motor; and an insulative pre-welding positioning means for holding the motor terminal and the output terminal before and during welding, the insulative pre-welding positioning means that directly contacts and holds the motor terminal and the output terminal, a slit or a groove is formed in the pre-welding positioning means, the motor terminal and the output terminal are inserted into the slit or the groove, and the pre-welding positioning means is provided near an inner peripheral wall of a casing that is disposed outside the motor terminal and the output terminal;

wherein a portion of the motor terminal including the end thereof and that of the output terminal including the end thereof each are formed to extend in parallel to an axial direction of the electric motor, and overlappingly connected with each other.

2. An electric driving device according to claim 1, wherein, the motor terminal and the output terminal overlap each other in a radial direction of the electric motor and are connected with each other.

3. An electric driving device according to claim 1, wherein the motor terminal and the output terminal are connected with each other by welding.

4. An electric driving device according to claim 3, wherein the welding is laser-welding.

5. An electric driving device according to claim 3, wherein the motor terminal and the output terminal are connected with each other in the radial direction of the motor from outside thereof.

6. An electric driving device according to claim 1, wherein a hole is made in the casing, facing the connecting portion of the motor terminal with the output terminal.

7. An electric driving device according to claim 6, wherein the connecting portion of the motor terminal with the output terminal is located in a space created by the casing and the pre-welding positioning means, and the space communicates with its outside through the hole.

8. An electric driving device according to claim 7, wherein the space is filled with insulative resin.

9. An electric driving device according to claim 8, wherein the hole of the casing is filled with the same insulative resin as that for the space.

10. An electric driving device according to claim 9, wherein outside of the hole of the casing is covered with a cover.

11. An electric driving device according to claim 1, wherein the connecting portion of the motor terminal with the output terminal is distant from the pre-welding positioning means.

12. An electric power steering apparatus, comprising an electric driving device according to claim 1.

13. An electric driving device, comprising:

an electric motor;

a controller that is disposed coaxially with an axis of the electric motor rotation shaft and takes control of driving the electric motor;

a motor terminal whose end extends from the electric motor toward the controller; and an output terminal whose end extends from the controller toward the electric motor; wherein a portion of the motor terminal including the end thereof and that of the output terminal including the end thereof each are formed to extend in parallel to an axial direction of the electric motor, an insulative pre-welding positioning means for holding the motor terminal and the output terminal before and during welding, the insulative pre-welding positioning means holds both terminals is provided near an inner peripheral wall of a casing that is disposed outside the motor terminal and the output terminal, and both terminals are overlappingly connected with each other, wherein a hole is made in either one of the motor terminal and the output terminal, and an inner circumference of the hole is connected by laser-welding.

14. An electric driving device, comprising:

an electric motor;

a controller that is disposed coaxially with an axis of the electric motor rotation shaft and takes control of driving the electric motor;

a motor terminal whose end extends from the electric motor toward the controller; and an output terminal whose end extends from the controller toward the electric motor; wherein a portion of the motor terminal including the end thereof and that of the output terminal including the end thereof each are formed to extend in parallel to an axial direction of the electric motor, an insulative pre-welding positioning means for holding the motor terminal and the output terminal before and during welding, the insulative pre-welding positioning means holds both terminals is provided near an inner peripheral wall of a casing that is disposed outside the motor terminal and the output terminal, and both terminals are overlappingly connected with each other, wherein a crank-shaped bent section is formed on the motor terminal, and the motor terminal is connected on a tip side of the bent section.

* * * * *